Figure 4:
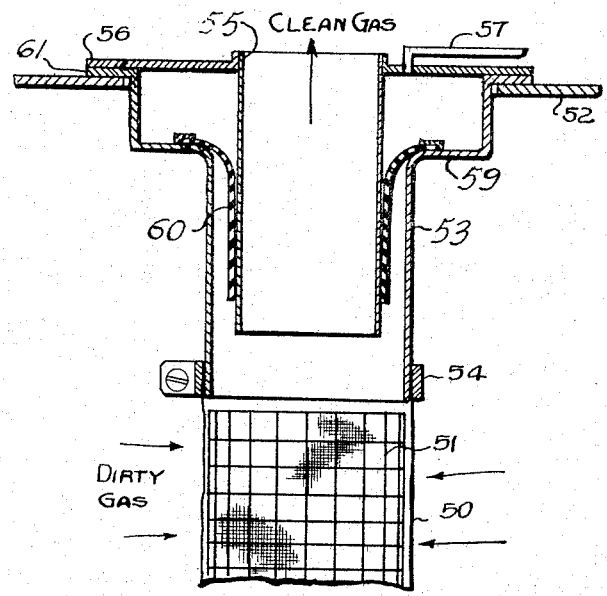

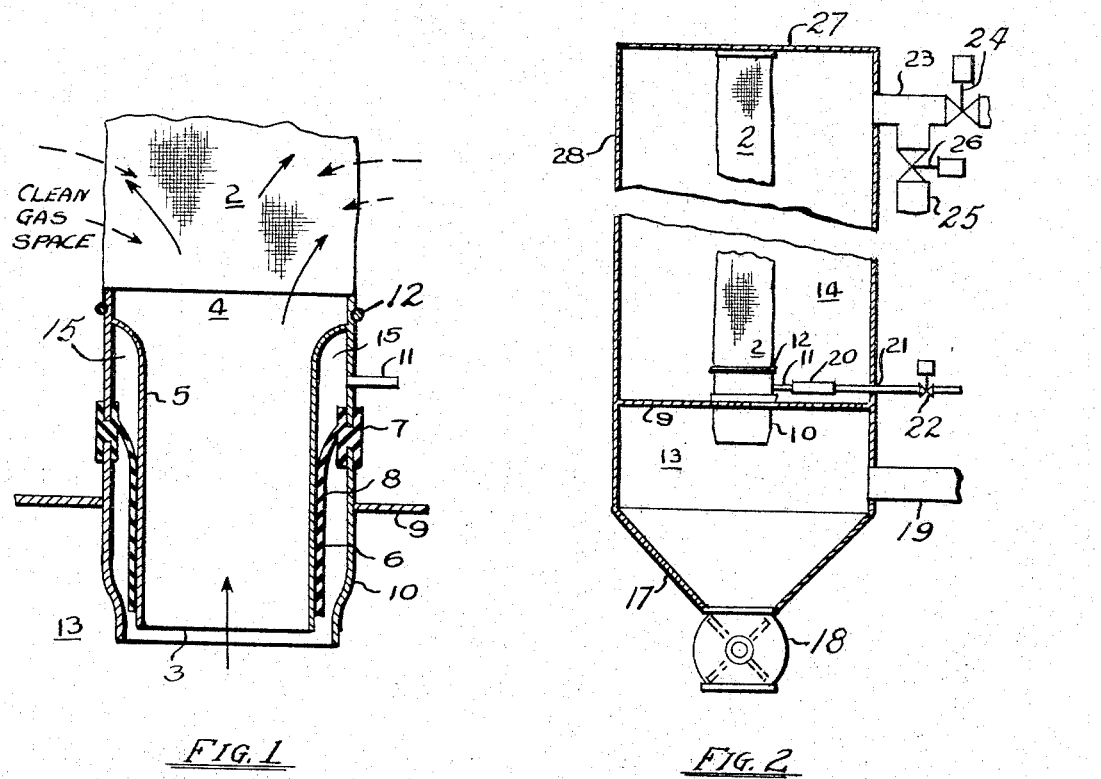
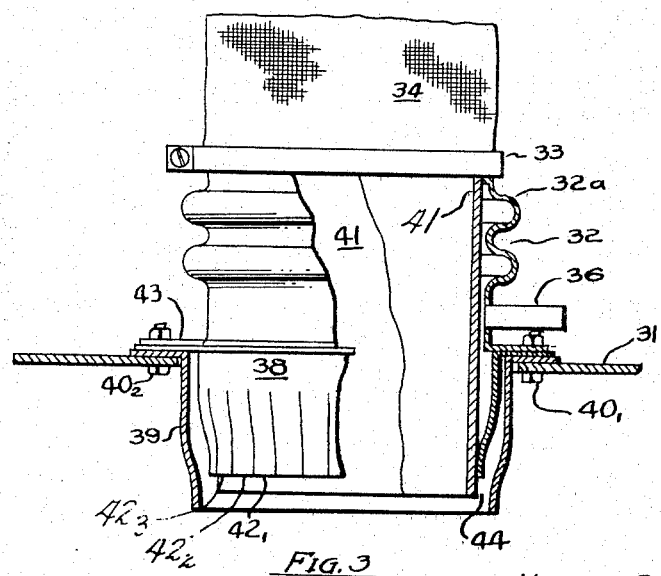

United States Patent Office 3,333,401
Patented Aug. 1, 1967

3,333,401
DUST COLLECTION APPARATUS
Harry I. Abboud, 5845 Clematis Drive,
Baton Rouge, La. 70808
Filed July 9, 1964, Ser. No. 381,407
4 Claims. (Cl. 55—293)

This invention relates to solids-gas separation apparatus. More particularly, the invention relates to improvements in bag filtering apparatus wherein dirty gas is freed of dusts or other fine solids carried with the dirty gas, by passing said dirty gas through the walls of an elongated fabric tube or bag, whereby the solids are retained on the fabric.

Bag filters of this general type have long been known in the art. A common problem associated with such equipment has been the frequent necessity of providing a cleaning operation at more or less frequent intervals. This arises because, as the solids or dusts are collected on the bag walls, they tend to cling thereto and build up a cake. This of course increases the resistance to gas flow, so that the throughput capacity is reduced. Consequently, it is necessary to periodically manually clean the bags, or to provide apparatus for cleaning by dislodging and removing the collected solids.

Various devices have been proposed to accomplish the cleaning function. Many such devices rely on and provide for mechanical flexing or shaking of the bags, frequently in conjunction with a temporary reversal of the gas pressure and flow. Such mechanical flexing apparatus has included, for example, twisting means for rotating one end of a bag through a limited arc of rotation and thus causing flexing of the fabric walls. Powered shaking means have been applied to cause the bags to shake and dislodge the solids which are allowed to fall by gravity into a collection zone or hopper. Apparatus has also been devised to generate sonic or ultra sonic energy waves directed toward the solids accumulated on a bag wall. Reverse gas flow alone has also been used to attempt to clean the bags.

Most of the preceding apparatus outlined above has been effective to some degree. However, frequently such apparatus is highly complicated, and subject to frequent repairs and maintenance needs, or has not been highly efficient.

An object of the present invention is to provide a novel apparatus for use in bag filtering apparatus for implementing and accomplishing a highly efficient and improved cleaning operation, viz, the removal of collected dust solids from the fabric wall of a filter bag or tube. Other objects will appear hereinafter.

In all forms of the invention, a distendible member is provided at an end of a filter bag adjacent to another member, the two forming a zone capable of receiving compressed gas. Provision is made for release of the compressed gas by distortion or expansion of the distendible or elastic member, with resultant generation of gas wave energy at pulse frequencies varying, as desired, from sub-sonic to above-sonic ranges.

The various forms of the invention are applicable to filter bags of various cross sections. Thus, cylindrical bags are most common, and the detailed descriptions hereinafter are, for convenience, with reference to cylindrical type bags. However, it will be seen that the apparatus of the present invention is also readily applicable to filter bags having oval or envelope cross-sectional configurations. By "envelope" is meant that two walls of a bag are separated by a narrow space, the walls being joined at their edges by semi-cylindrical sections. In a variation of the envelope design, seams along the walls at intervals, parallel to the edges, convert the bag configuration to a plurality of tangential cylindrical segments.

In certain refined embodiments of the invention, the energy supplied by the compressed gas feed is directly converted, also, in part, to mechanical vibration which is transmitted directly to the filter bag, thus providing mechanical vibration concurrently with the gas wave energy.

In still additional embodiments, the escaping activating gas is further utilized to establish a pressure differential across a bag wall which is the reverse of the pressure differential accompanying the usual filtering action.

Figure 5:
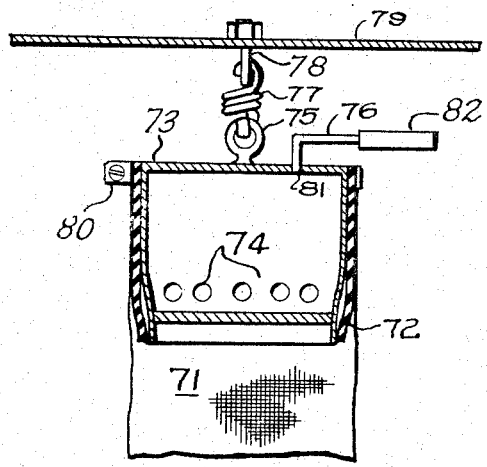

The details of construction and operation of various specific embodiments of the invention are described hereinafter with specific reference to the figures, which include:

FIG. 1, a partially sectioned elevation view of a typical embodiment in position at the bottom of a filter bag or tube of the inside filtering type;

FIG. 2, an elevation of a single bag of a filtering installation showing the cleaning apparatus of FIG. 1 in place;

FIG. 3, an elevation view, in partial section, of another embodiment of the invention;

FIG. 4, a partially sectioned, elevation illustration of a portion of a bag filter installation of the outside filtering type, in which the cleaning apparatus of the present invention is applied or positioned at the upper end of the filter tubes; and FIG. 5, a partially sectional elevation view of another application in an inside filtering bag filter at the top of said filter element.

Referring to FIG. 1, a particular embodiment of the improved cleaning apparatus is shown in operative attachment to the lower end of a bag 2 of the inside filtering type. In such an installation, a dirty gas feed space 13 is separated by a barrier plate 9 from a clean gas space 14. The bag wall 2 filters solids or dusts from the dirty uprising gas, during normal filtering operation.

It is seen that the cleaning apparatus assembly occupies an opening in the barrier plate 9 and serves as a conduit for uprising dirty gas during normal operation as indicated by the arrows indicating gas flow. The principal parts of the assembly include a metal connector or nozzle piece 3 and a vibrator element 6. Considering firstly the connector piece 3, this is a unitary metal shape having two principal segments, a collar segment 4 and a throat segment 5. The collar segment 4 is a short cylinder having a diameter corresponding to the filter bag 2. The filter bag is attached to the collar segment 4 by being pressed into a shallow peripheral groove by a spring steel snap ring or clamp 12.

At an intermediate, internal peripheral line on the interior wall of the collar segment 4, the throat segment 5 is attached. In this embodiment the throat segment 5 is, generally, a cylindrical member, except for the flaring at the upper end to join the collar segment 4. At a point in the wall of the collar segment 4 below the line of attachment of the throat segment 5, an inlet gas tube 11 is provided for introducing activating gas under pressure, as hereafter described.

The above described connector piece 3 is preferably made of thin sectional metal. In manufacture, the collar segment 4 and the throat segment 5 would normally be fabricated separately and then joined by welding or brazing at the internal peripheral junction line to provide the complete unit. The upper end of the collar segment 4 is desirably rounded to avoid an inside corner for lodgement of falling dust. The vibrator unit 6 includes a connecting ring 7 and a skirt segment 8. The connecting ring 7 is a gasket-like segment having grooves in the top and bottom to accommodate and snugly engage the lower portion or rim of the collar segment 4, and the upper extremity of an external nozzle segment 10 mounted and affixed to the aperture in the barrier plate 9. The skirt segment 8 is attached to the inner surface of the connecting ring 7 and extends downwardly toward the lower extremity of the throat segment 5. The throat segment 5 is gripped tightly by the skirt segment 8, which extends to or near the lower rim of the nozzle segment 5.

The vibrator unit 6 is usually made of rubber or a synthetic resilient heat resistant elastomer such as neoprene, nylon, polypropylene or some long lasting elastic resin.

The final element of the assembly is an outside nozzle 10 affixed in the opening or aperture in the barrier plate 9 and extending downwardly and surrounding concentrically the throat nozzle segment 5 and the skirt segment 8. In this embodiment, the outside nozzle 10 is flared and converges inwardly toward its lower extremity, to establish a small, or narrow annular space 15 between the exterior surface of the throat nozzle segment 5 and the wall of the exterior nozzle 10, which space, however, is greater than and only partially occupied by the extensible skirt portion 8.

Considering now the operational interrelationships of the several above described segments, it is seen that, during normal filtering operation, the dirty gas travels through the assembly and is filtered of dusts by passage through the walls of the bag 2. No activating gas is supplied through the feed tube 11 during such normal filtering.

At periodic intervals, a cleaning cycle of from several seconds to several minutes is carried out. During a cleaning cycle, the normal gas differential pressure is desirably, but not essentially, reversed, by means not shown, to cause a reverse pressure drop across the filter bag wall 2, as indicated by the dotted arrows.

The cleaning action of the assembly results from feed, through gas connector 11, of a compressed operating gas which can be at a pressure, illustratively, of several pounds up to several hundred pounds per square inch. It will be seen that the compressed gas enters an annular chamber 15 formed by the connector piece 3 and the vibrator 6. There is no escape path for such gas, except by expansion or dilation of the skirt 8. This release mechanism takes the form of vibrations of the skirt 8 in the narrow annular space formed by the throat piece 5 and the wall of the nozzle 10. Dependent on various factors, the rapidity of such vibrations can vary from the sub-sonic to ultrasonic frequency, viz, from about several to several thousand cycles per second.

The gas wave energy thus established radiates upwardly through the interior of the filter bag 2 to be impressed on and agitate the dust deposited on the inner face of the bag 2. It is also seen that the successive application of pressure pulses in the chamber 15 causes upward thrust pulses, which are terminated by the release of the gas past the skirt 5. These pulses, generally coincident with the gas wave energy being generated, cause vertical vibration of the bag 2, thus further aiding in release of the filtered dusts from the interior thereof.

Vertical movement of the end of the bag 2 tends to distend the adapter ring 7, and the contraction of the ring aids in downward movement of the bag 2 on that portion of such a mechanical vibration cycle. Clamping bands or spring rings, not shown, can be provided to provide a non-slipping engagement of the adapter ring 7 to the collar 4 and the upper extremity of the nozzle 10, respectively. Ordinarily, the natural gripping action of the adapter ring 7 on the collar member 4, and on the upper portion of the nozzle 10, is sufficient.

In addition to the gas wave energy and the mechanical vibration energy imparted to the system, as above described, this assembly provides still another beneficial action. The relatively high velocity of the compressed activating gas passing downwardly through the annular space 16 provides an aspirating or entraining action to the surrounded gas in the lower portion of the nozzle member, whereby its static pressure is decreased, thus creating or aiding the reverse gas flow of a cleaning cycle, as indicated by the dotted arrows.

The relative position and functional relationship of the cleaning unit shown in FIG. 1, to a filter installation, is further shown in FIG. 2, a schematic sectional view of a single bag filter unit having the improved apparatus of FIG. 1 (Common elements are identified as in FIG. 1).

Referring to FIG. 2, the bag 2 is vertically suspended from the roof plate 27 of a filter casing or chamber 28. The barrier plate 9 divides the clean gas space 14 from the dirty gas space 13, an aperture in the plate 9 being occupied by the cleaning appartus already described.

The inlet tube 11 for the activating compressed gas is connected by a flexible tubing 20 to a supply line 21 for the gas, a motorized valve 22 being provided in said supply line.

The lower part of the filter casing 28, below the barrier plate 9 form the dirty gas chamber 13, and is terminated by a hopper section 17 in which is collected the dusts removed from the inside of the filter bag 2 by a cleaning cycle or cycles. A start valve assembly 18 is provided at the lower end for discharge of the dusts to an external container, not shown, without permitting significant gas passage.

Dirty gas is supplied through line 19. A discharge line 23 for clean gas communicates to the clean gas chamber 14. A branch line 25 connecting to the clean gas line 23 is provided for feeding clean gas during a cleaning cycle. Motorized valves 24, 26 in the clean gas outlet line 23 and the branch line 25, respectively, provide for control of flow therethrough.

In normal filtering operation clean gas is drawn, by an evacuating blower not shown, through the clean gas line 23, the branch line valve 26 being closed. During a cleaning cycle, the valve 24 is closed and cleaned gas is recirculated through line 25 by a supplemental blower, not shown. It will be understood that such an operation preferably involves a plurality of filter units, so that the clean gas used can be taken from a clean gas manifold, rather than being air which would dilute, and increase, the gas to be removed by the evacuating blower.

During a cleaning cycle, activating compressed gas is supplied to the cleaning mechanism through line 21, by timed operation of the valve 22. Typical cleaning cycles are for periods of 15 seconds to 5 minutes, at intervals from about 1 minute to 30 minutes of normal filtering time.

It will be understood that, in most installations, instead of one filter tube in a shell as shown in FIG. 2, a substantial number of, say 40 to 1,000, are employed, closely spaced for maximum capacity. Customarily, also, a group of such multiple bag units are provided, operating in parallel with the cleaning cycles sequentially staggered and with the cyclic operations governed by appropriate timing mechanism.

Numerous other embodiments of the improved cleaning apparatus can be provided for different services. One such embodiment is that shown in by FIG. 3, which avoids the use of elastomeric or polymeric materials, but instead is wholly metal in construction and is suitable for high temperature service, as, for example, up to and above 500° F.

Referring to FIG. 3, a sectional elevation of this embodiment is shown mounted in a barrier plate 31 of a filter installation generally similar to the installation illustrated by FIGURES 1 and 2. In this example, a connector piece 32 is in the form of a short cylinder of relatively thin metal, and has a short segment 32a having a corrugated or bellows type configuration. The top end is gripped by a clamping band 33, which also secures the lower end of the bag 34 and concurrently grips and secures in place an internal, cylindrical throat member 41.

The connector piece 32 is provided with a narrow flange 43. Other flanged elements include the vibrator element 38 and an external nozzle 39, these flanged elements being secured to the plate 31 by appropriate fasteners $40_1$, $40_2$.

In contrast to the embodiment of FIG. 1, the vibrator element 38 is of metal construction. The lowermost portion, having a downwardly converging configuration to grip tightly the external portion of the throat member 41, has a series of slits therein, forming a series of reed-like portions $42_1$, $42_2$, $42_3$ which are susceptible to outward flexure and vibration under the influence of the activating gas when supplied through the feed line 36.

The nozzle member 39 converges or diminishes in diameter in a downward direction, to establish a very narrow, annular, gas escape passage 44.

The operation of this embodiment is generally similar to the operation of the embodiment of FIG. 1, vibrational energy being applied to the bag 34 as well as gas wave energy to the dusts deposited on the wall.

In addition to application of the cleaning apparatus to the lower end of filter tubes of the inside filtering type, other embodiments can be readily applied to installations of the outside filtering type, or at the top ends of the filter tubes. An illustration of adaptation in an outside filtering type of installation is given by FIG. 4.

Referring to FIG. 4, in this installation the bag 50 is suspended from the barrier plate 52 by the cleaning apparatus as described below. A cylindrical mesh device 51 is mounted inside the bag 50 to prevent collapse during normal filtering action.

The cleaning apparatus includes a connector piece 53, a nozzle element 55, and a vibrating element 60. The connector 53 is in the form of two short cylindrical members, connected by a flat portion 59, and having a top flange member 61 for fastening to the barrier plate 52. The top of the bag 50 is secured to the lower end of the connector piece 53 by a clamping band 54.

The interior nozzle element 55 is supported by a flange member 56 which also supports a compressed gas inlet line 57. The lower end of the nozzle member 55 forms, with the lower interior of the connector piece 53, a narrow annular passage which is partly occupied by the lower end of a vibrator element 60. As in other embodiments, the vibrator 60 normally grips the outside nozzle surface tightly. The upper end of the resilient vibrator 60 is secured to the interior of the connector piece 53.

In a cleaning cycle operation, as in other embodiments, compressed gas is fed through feed line 57 and escapes by distentions of the vibrator element, causing gas waves to emanate and be radiated to the bag wall and dust deposits thereon, facilitating and causing release from the fabric of the walls.

In this embodiment, the flat section 59 of the connector piece 53 and the flange 56 are normally of quite thin gauge metal, so that the bag 50 is capable of limited vertical vibration by flexing of the flat portion 59. Under the influence of compressed gas during a cleaning cycle, it is seen that the flat portion 59 will tend to be bulged downwardly, and to retract upon release of pressure. Thus, in this embodiment, the power provided by the activating gas is concurrently employed to generate vibrational mechanical energy which is applied directly to the bag, as well as the sonic or gas wave energy generated by the vibrational element 60.

Further, in this embodiment, the activating gas, being released directly into the interior of the bag 50 exerts a desirable reverse pressure differential aiding in the dislodgement of dusts from the exterior of the filter bags.

Yet another embodiment is illustrated by FIG. 5, showing an installation at the upper end of a filter bag of the inside filtering type. Referring to FIG. 5, the principal elements of this installation include a chamber 73 and a distendible sleeve element 72. The chamber is closed, except for a series of apertures 74 and an inlet port 81 to which is attached an inlet tube 76, which is supplied compressed gas by a flexible line 82.

The bag 71 and the upper end of the distendible member 72 are secured to the upper rim of the chamber 73 by a clamping band 80.

The cleaning apparatus, and the bag, are desirably suspended by a spring 77 connecting the suspension bar 75 to an eyebolt which is fastened to the upper plate 79 of the filter enclosure or casing.

In operation during a cleaning cycle, compressed gas is introduced through the inlet tube 76, escapes from the chamber 73 through the ports 74 and causes pulsating distentions of the sleeve 72. The gas wave energy thus generated impinges on or vibrates the dust deposited on the interior of the bag 71 and causes its dislodgement. The escaping action of the gas further results in the vertical vibration of the chamber 73 which is transmitted to the bag, further aiding in the cleaning operation.

The spring suspension is not essential, but the suspension should desirably be flexible enough to permit some slight vertical vibration of the assembly and the bag end.

Having fully described my invention and certain embodiments thereof, what is claimed is:

1. In a bag filter for removing suspended dusts from gases having at least one vertically suspended bag in an enclosure chamber, a gas activated apparatus for cleaning a filter bag by dislodging filter solids from the bag wall, said apparatus including a relatively short tubular element having a cross section substantially corresponding to a filter bag cross section and positioned concentrically with and at one end of said bag, a sleeve of resilient material surrounding and having a portion normally gripping said tubular element but capable of vibratory release, at the lower end thereof, of gas under pressure, when gas is supplied between the tubular element and said sleeve, and flexible, gas impervious mounting means, surrounding a part of the tubular element and forming with the said sleeve a gas chamber around the tubular element and resiliently connecting the bag end to an enclosure chamber wall, and a gas conduit to supply gas to the gas chamber around the tubular element, whereby supplying gas through the gas conduit results in generation of gas wave pulsations which are transmitted at least in part to the interior of the bag, and corresponding mechanical pulsations which are transmitted directly to the bag during the period of the supply and release of gas.

2. In a bag filter for removing suspended ducts from gases, having a bottom feed chamber for feed of dirty gas to at least one vertically suspended bag which connects to an aperture in a wall of the feed chamber, a gas activated apparatus for cleaning a filter bag by dislodging filter solids from the bag wall, said apparatus including a relatively short tubular element having a cross section essentially corresponding to a filter bag cross section and secured to the lower end of the said bag, a sleeve of resilient material surrounding and having a portion normally gripping said tubular element but capable of vibratory release, at the lower end thereof, of gas under pressure, when gas is supplied between the tubular element and said sleeve, and flexible, gas impervious mounting means, surrounding a part of the tubular element and forming with the said sleeve a gas chamber around the tubular element and resiliently connecting the apparatus to the feed chamber wall, and a gas conduit to supply gas to the gas chamber around the tubular element, whereby supplying gas through the gas feed conduit results in generation of gas wave pulsations which are transmitted at least in part to the interior of the bag, and corresponding mechanical pulsations which are transmitted directly to the bag during the period of the supply and release of gas.

3. In a bag filter for removing suspended dusts from gases having a vertically suspended bag in a dirty gas chamber and having a top discharge into a clean gas chamber, a gas activated apparatus for cleaning the filter bag by dislodging filter solids from the bag wall, said apparatus including a relatively short tubular element at the top of the bag for discharge of clean gas into a clean gas chamber, a connector piece surrounding the said tubular element and connecting at one end to the bag end and at the other end to an aperture in the clean gas chamber wall, and having a flexible section intermediate its ends permitting vibration of the bag end of the connector piece relative to the aperture connecting end, a sleeve of resilient material surrounding a portion of the said tubular element and within said connector piece having one end joined to said connector piece and the other end resiliently gripping said tubular member, forming thereby a chamber surrounding the short tubular element and capable of vibratory release of gas from said chamber when gas is supplied to said chamber, and a gas conduit to supply gas to said chamber, whereby supplying gas through the gas feed conduit results in generation of gas wave pulsations which are transmitted at least in part to the interior of the bag, and corresponding mechanical pulsations which are transmitted directly to the bag during the period of the supply and release of gas.

4. In a bag filter for removing suspended dusts from gases having at least one vertical filter bag suspended in a clean gas chamber for interiorly receiving dirty gas and discharging cleaned gas into said chamber, a gas activated apparatus for cleaning the filter bag by dislodging filtered solids from the bag wall, said apparatus including a relatively short tubular element closed at the top and bottom ends and positioned at the top of the bag, having the top of the bag fastened thereto and forming thereby a closure for the end of the bag, a sleeve of resilient material within the bag and surrounding at least a portion of the said tubular element, the lower portion of said sleeve normally gripping the tubular element but capable of vibratory release of gas under pressure when gas is supplied between the tubular element and said sleeve, a gas feed conduit to supply gas to the interior of said tubular element and means providing communication between the interior of said tubular element and the space between the tubular element and the sleeve, and mounting means resiliently suspending the apparatus and bag, whereby supplying gas through the gas feed conduit results in generation of gas wave pulsations which are transmitted at least in part to the interior of the bag and corresponding mechanical pulsations which are transmitted directly to the bag wall during the period of supply and release of gas.

References Cited

UNITED STATES PATENTS

| 1,118,045 | 11/1914 | Playter | 55—291 |
| 3,167,415 | 1/1965 | Edwards | 55—302 |

FOREIGN PATENTS

| 649,123 | 9/1962 | Canada. |
| 488,129 | 7/1938 | Great Britain. |

HARRY B. THORNTON, *Primary Examiner.*